US008591090B2

(12) United States Patent
Lin

(10) Patent No.: US 8,591,090 B2
(45) Date of Patent: Nov. 26, 2013

(54) BACKLIGHT MODULE AND LIGHT GUIDE PLATE THEREOF

(75) Inventor: I-Thun Lin, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 454 days.

(21) Appl. No.: 12/906,123

(22) Filed: Oct. 17, 2010

(65) Prior Publication Data

US 2011/0194308 A1 Aug. 11, 2011

(30) Foreign Application Priority Data

Feb. 6, 2010 (TW) .................................. 99103629

(51) Int. Cl.
*F21V 7/04* (2006.01)

(52) U.S. Cl.
USPC ............ 362/619; 362/612; 362/621; 362/625

(58) Field of Classification Search
USPC ......... 362/612, 600, 606, 610, 615, 616, 618, 362/619, 621, 622, 623, 624, 625, 627, 628, 362/559, 97.1–97.4
See application file for complete search history.

(56) References Cited

U.S. PATENT DOCUMENTS

| 5,394,255 | A  | * | 2/1995  | Yokota et al. ................... 349/64 |
| 5,575,549 | A  | * | 11/1996 | Ishikawa et al. .............. 362/625 |
| 6,530,671 | B2 | * | 3/2003  | Taniguchi et al. ............ 362/619 |
| 2002/0054489 | A1 | * | 5/2002 | Hirayama ....................... 362/31 |
| 2010/0079980 | A1 | * | 4/2010 | Sakai ........................... 362/97.1 |
| 2010/0238136 | A1 | * | 9/2010 | Chang ........................... 345/175 |

FOREIGN PATENT DOCUMENTS

| CN | 2420664 Y    | 2/2001 |
| CN | 201004095 Y  | 1/2008 |

* cited by examiner

*Primary Examiner* — Jason Moon Han
*Assistant Examiner* — Danielle Allen
(74) *Attorney, Agent, or Firm* — Altis & Wispro Law Group, Inc.

(57) ABSTRACT

A light guide plate for distributing light from a light source includes a light scattering surface, a light output surface opposite to the light scattering surface, and a number of side surfaces surrounding the light scattering surface and the light output surface. The light scattering surface includes a number of light scattering dots thereon. The light scattering dots are arranged into a number of rows arranged from a first side of the light scattering surface to an opposite side of the light scattering surface. A distance between every two adjacent rows of the light scattering dots gradually decreases from the first side to the second side, such that the light scattering dots at the second side of the light scattering surface have a greater density than the light scattering dots at the first side of the light scattering surface.

20 Claims, 3 Drawing Sheets

BACKLIGHT MODULE AND LIGHT GUIDE PLATE THEREOF

CROSS-REFERENCE TO RELATED APPLICATIONS

This application claims all benefits accruing under 35 U.S.C. §119 from Taiwan Patent Application No. 99103629, filed on Feb. 6, 2010, in the Taiwan Intellectual Property Office, the contents of which are hereby incorporated by reference.

BACKGROUND

1. Technical Field

The present disclosure relates to backlight modules, and more particularly to a light guide plate used in a backlight module.

2. Description of Related Art

Backlight modules are known in the art and are commonly used in liquid crystal displays. Typically, a backlight module includes a light guide plate and a light source located at an edge of the light guide plate. The light guide plate distributes light from the light source. The light from the light source can be blocked by some functional holes or recesses defined in the light guide plate, causing a shadow to form behind the holes or recesses. Therefore, the output light of the light guide plate is not uniform and is inefficient.

What is needed, therefore, is a backlight module which can overcome the above problems.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

Figure 1:
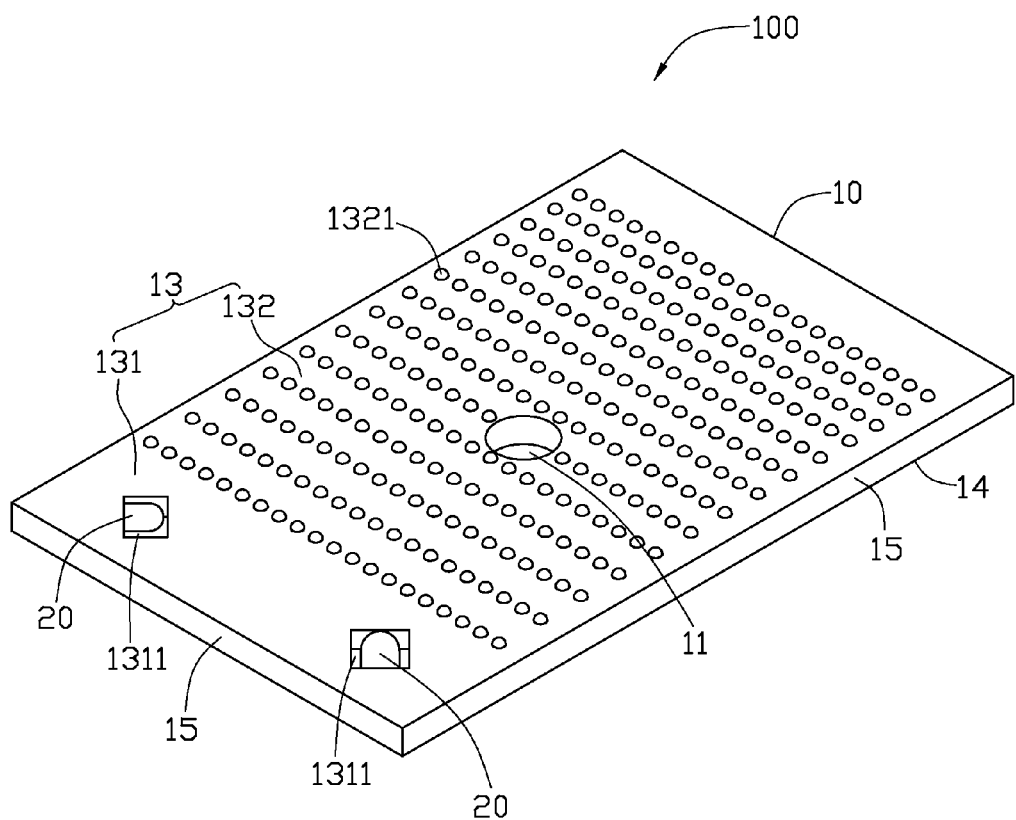
FIG. 1 is an isometric, assembled view of a backlight module in accordance with a first embodiment of the present disclosure.
Figure 2:
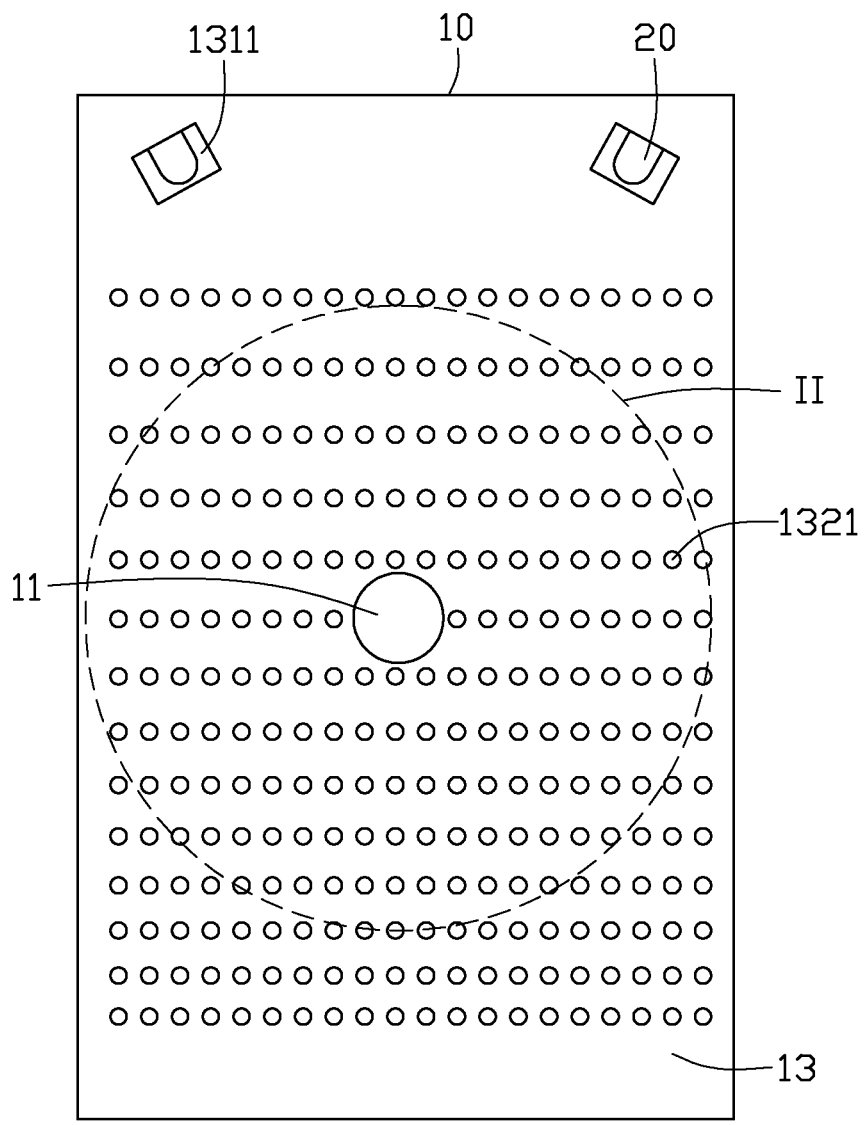
FIG. 2 is a top view of the backlight module of FIG. 1.

Referring to FIGS. 1 and 2, a backlight module 100 in accordance with a first embodiment of the present disclosure is shown. The backlight module 100 includes a light guide plate 10 and two light sources 20 mounted on the light guide plate 10.

The light guide plate 10 can be a small-size light emitting diode (LED) light guide plate. The two light sources 20 are two LEDs. The light guide plate 10 is made of a transparent material, such as acrylic ester, polycarbonate, polyvinyl ester, or glass. The light guide plate 10 can be rectangular. A mounting hole 11 is defined in a middle portion of the light guide plate 10. The mounting hole 11 is used for mounting a component (not shown) on the light guide plate 10. In this embodiment, the backlight module 100 can be used as a backlight module in a digital clock, and the mounting hole 11 for mounting indexes of the digital clock.

The light guide plate 10 includes a light scattering surface 13, a light output surface 14 opposite to the light scattering surface 13, and four side surfaces 15 surrounding the light scattering surface 13 and the light output surface 14.

The light scattering surface 13 includes a mounting portion 131 near a side surface 15 of the light guide plate 10, and a light scattering portion 132 beside the mounting portion 131. The mounting hole 11 is defined in the middle portion of the light scattering portion 132. Two receiving recesses 1311 are defined in the mounting portion 131. The two receiving recesses 1311 are spaced from each other and respectively located near two corners of the light guide plate 10. Each of the two receiving recesses 1311 can be rectangular and obliquely oriented relative to the mounting hole 11. Distances between the two receiving recesses 1311 and the mounting hole 11 are substantially equal, i.e. the perpendicular bisector of a line between the two receiving recesses 1311 passing through the mounting hole 11. The two light sources 20 are respectively received in the two receiving recesses 1311. Each of the light sources 20 opposes the mounting hole 11.

A number of fine light scattering dots 1321 are formed on the light scattering portion 132 of the light scattering surface 13 in a dot pattern. The light scattering dots 1321 are substantially identical to each other and surround the mounting hole 11. Each of the light scattering dots 1321 can be a hemispherical protrusion protruding upward from the light scattering portion 132. The light scattering dot 1321 can be formed on the light scattering portion 132 of the light scattering surface 13 by printing or injection molding. The light scattering dots 1321 can be arranged in a rectangular array by a number of rows and columns, wherein each row is substantially parallel with the line between the two receiving recesses 1311 and each column is substantially perpendicular to each row. The light scattering dots 1321 in each column are arranged along a lengthwise direction of the light guide plate 10 front one side of the light scattering surface 13 adjacent to the light, sources 20 to an opposite side of the light scattering surface 13. In addition, the light scattering dots 1321 in each row are arranged along the width direction of the light guide plate 10 from one lateral side of the light scattering surface 13 to an opposite lateral side of the light scattering surface 13. The light scattering dots 1321 of each row are aligned with each other along the width direction of the light guide plate 10, and the light scattering dots 1321 of each column are aligned with each other along the lengthwise direction of the light guide plate 10. A visible area II is defined on the light scattering surface 13 by the broken line shown in FIG. 2. In this embodiment, the visible area 11 is a circular area defined by a circle (shown in the broken line) around the mounting hole 11. A distance ($R_n$) between two adjacent rows of the light scattering dots 1321 varies in accordance with the following formula:

$$R_n = A_1 + (A_2 \times D_n) + (A_3 \times D_n^2) + (A_4 \times D_n^3) + (A_5 \times D_n^4) + (A_6 \times D_n^5) + (A_7 \times D_n^6)$$

wherein $R_n$ is a distance between two adjacent rows of the light scattering dots 1321 (i.e., the No. n and n−1 rows), n is the row number and increases in a consecutive manner along the lengthwise direction of the light guide plate 10 from the mounting portion 131 of the light scattering surface 13, $D_n$ is a distance between the No. n row of the light scattering dots 1321 and the light sources 20, and $A_1$ through $A_7$ are constants such as any descending values less than 1 but greater than 0. For example, if $A_1$ is 0.9, $A_2$ through $A_7$ can be any descending values less than 0.9 but greater than 0.

The above formula is used for determining the distance ($R_n$) between every two adjacent rows of the light scattering dots 1321. The distance between the first row of the light scattering dots 1321 and the light sources 20 can be any value greater than 0 according to the position of the light scattering portion 132 of the light guide plate 10 relative to the light sources 20. Once the distance between the first row of the light scattering dots 1321 and the light sources 20 is determined as B, the distance between the second row of the light scattering dots 1321 and the light sources 20 is B+R$_2$. According to the above formula, an equation for R$_2$, i.e. the distance between the second row and the first row of the light scattering dots 1321, can be accomplished as shown below:

$$R_2 = A_1 + A_2 \times (B+R_2) + A_3 \times (B+R_2)^2 + A_4 \times (B+R_2)^3 + A_5 \times (B+R_2)^4 + A_6 \times (B+R_2)^5 + A_7 \times (B+R_2)^6$$

In the equation, A1 through A7 and B are constants. According to the above equation, the value of R$_2$ can be determined, and the position of the second row of the light scattering dots 1321 is thus determined. Similarly, positions of the other rows of the light scattering dots 1321 can also be determined by the above formula.

Light emitted by the light sources 20 enters the light guide plate 10 through the receiving recess 1311 of the light guide plate 10. Part of the light radiates out of the light guide plate 10 directly from the light output surface 14 of the light guide plate 10. Other parts of the light radiates to the light scattering surface 13 and the side surfaces 15. The light radiating to the light scattering surface 13 is scattered by the light scattering dots 1321 of the light scattering surface 13 and reflected back to the light guide plate 10. The light radiating to the side surfaces 15 is reflected back to the light guide plate 10 by the side surfaces 15. Finally, the light of the light sources 20 radiates out of the light guide plate 10 from the light output surface 14 of the light guide plate 10.

In the light guide plate 10, the intensity of the light of the light sources 20 decreases gradually during transmission in the light guide plate 10 along a transmission direction of the light. However, in the above formula for R$_n$, R$_n$ decreases gradually as D$_n$ increases. Thus, a density of the light scattering dots 1321 gradually increases from the light sources 20 along the lengthwise direction of the light guide plate 10. A dense distribution of the light scattering dots 1321 can scatter more light. Therefore, in the present disclosure, light scattered by the light scattering dots 1321 is uniform, and the uniformity of luminance emitting from the light output surface 14 is improved.

In addition, according to the above formula, a density of the light scattering dots 1321 at a lower side of the mounting hole 11 is greater than that of the light scattering dots 1321 at an upper side of the mounting hole 11. Therefore, even though the light emitted by the light sources 20 is blocked by the mounting hole 11, when light passes through the mounting hole 11, the dense light scattering dots 1321 at the lower side of the mounting hole 11 scatter more light to weaken a shadow behind the mounting hole 11. Furthermore, the backlight module 100 incorporating the light guide plate 10 is provided with more than one light source 20, and the light sources 20 radiate light to the mounting hole 11 from different directions. When a shadow is formed behind the mounting hole 11 from the light of one of the light sources 20, the light of the other light source 20 can reach the rear portion of the mounting hole 11 to weaken the shadow, thereby rendering a constant light output from the light guide plate 10.

Figure 3:
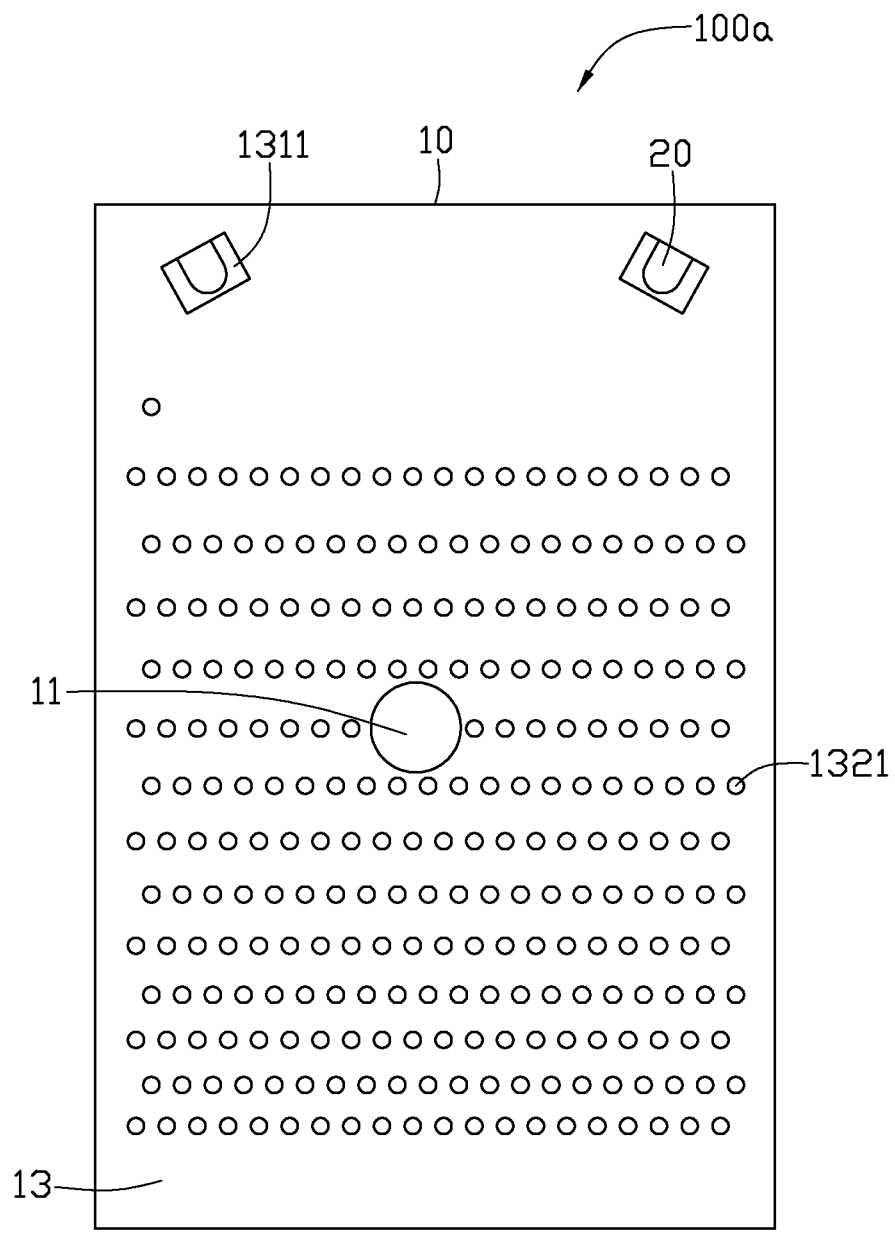
FIG. 3 is a top view of a backlight module in accordance with a second embodiment of the present disclosure.

FIG. 3 shows an alternative embodiment of a backlight module 100a of the present disclosure, in which the light scattering dots 1321 are arranged differently from the previous embodiment. The light scattering dots 1321 in adjacent rows are alternately arranged with each other along the lengthwise direction of the light guide plate 10, further promoting the scattering efficiency of the light scattering dots 1321.

It is to be understood, however, that even though numerous characteristics and advantages of the disclosure have been set forth in the foregoing description, together with details of the structure and function of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A light guide plate adapted for distributing light from a light source, the light guide plate comprising:
   a light scattering surface;
   a light output surface opposite to the light scattering surface; and
   a plurality of side surfaces surrounding the light scattering surface and the light output surface,
   wherein the light scattering surface comprises a mounting portion adjacent to a side surface of the light guide plate and a light scattering portion beside the mounting portion, a plurality of light scattering dots are formed on the light scattering portion of the light scattering surface;
   at least two receiving recesses are defined at the mounting portion adjacent to first side of the light scattering, surface, a mounting hole is defined approximately in a middle portion of the light scattering surface, the at least two receiving recesses are obliquely oriented to the mounting hole and are adapted for receiving at least two light sources therein; and
   the light scattering dots surround the mounting hole and are arranged in a plurality of rows from the first side of the light scattering surface to an opposite second side of the light scattering surface, and a distance between every two adjacent rows of the light scattering dots gradually decreases from the first side to the second side of the light scattering surface, such that the light scattering dots at the second side of the light scattering surface have a greater density than the light scattering dots at the first side of the light scattering surface.

2. The light guide plate as described in claim 1, wherein a distance between every two adjacent rows of the light scattering dots varies in accordance with the formula:

$$R_n = A_1 + (A_2 \times D_n) + (A_3 \times D_n^2) + (A_4 \times D_n^3) + (A_5 \times D_n^4) + (A_6 \times D_n^5) + (A_7 \times D_n^6)$$

wherein n is the row number and increases in a consecutive manner from the first side to the second side of the light scattering surface, R$_n$ is a distance between the nth row of the light scattering dots and the (n−1)th row of the light scattering dots, D$_n$ is a distance between the nth row of the light scattering dots and the light sources, and A$_1$ through A$_7$ are constants having descending values less than 1 but greater than 0.

3. The light guide plate as described in claim 1, wherein a circular visible area is defined on the light scattering surface around the mounting hole to cause the light guide plate to be used in a digital clock when the mounting hole is used for mounting indexes of the digital clock.

4. The light guide plate as described in claim 1, wherein the light scattering dots are hemispherical protrusions protruding upwardly from the light scattering surface.

5. The light guide plate as described in claim 1, wherein the plurality of rows of the light scattering dots are arranged from the first side to the second side of the light scattering surface along a lengthwise direction of the light guide plate, and the light scattering dots in each row are arranged on the light scattering surface along a width direction of the light guide plate.

6. The light guide plate as described in claim 5, wherein the light scattering dots of adjacent rows are aligned with each other along the lengthwise direction of the light guide plate.

7. The light guide plate as described in claim 5, wherein the light scattering dots of adjacent rows are arranged alternately to each other along the lengthwise direction of the light guide plate.

8. A backlight module comprising:
   at least two light sources; and
   a light guide plate for distributing light from the at least two light sources, the light guide plate comprising:
   a light scattering surface;
   a light output surface opposite to the light scattering surface; and
   a plurality of side surfaces surrounding the light scattering surface and the light output surface;
   wherein the light scattering surface comprises a mounting portion adjacent to a side surface of the light guide plate and a light scattering portion beside the mounting portion, a plurality of light scattering dots are formed on the light scattering portion of the light scattering surface;
   at least two receiving recesses are defined at the mounting portion adjacent to a first side of the light scattering surface, a mounting hole is defined approximately in a middle portion of the light scattering surface, the at least two receiving recesses are obliquely oriented to the mounting hole and are adapted for receiving the at least two light sources therein, and
   the light scattering dots surround the mounting hole and are arranged in a plurality of rows from the first side of the light scattering surface adjacent to the at least two light sources to an opposite second side of the light scattering surface distant from the at least two light sources, and a distance between every two adjacent rows of the light scattering dots gradually decreases from the first side to the second side of the light scattering surface, whereby the light scattering dots at the second side of the light scattering surface have a density greater than the light scattering dots at the first side of the light scattering surface.

9. The backlight module as described in claim 8, wherein a distance between every two adjacent rows of the light scattering dots varies in accordance with the formula:

$$R_n = A_1 + (A_2 \times D_n) + (A_3 \times D_n^2) + (A_4 \times D_n^3) + (A_5 \times D_n^4) + (A_6 \times D_n^5) + (A_7 \times D_n^6)$$

wherein n is the row number and increases in a consecutive manner from the first side to the second side of the light scattering surface, $R_n$ is a distance between the nth row of the light scattering dots and the (n−1)th row of the light scattering dots, $D_n$ is a distance between the nth row of the light scattering dots and the light sources, and $A_1$ through $A_7$ are constants having descending values less than 1 but greater than 0.

10. The backlight module as described in claim 8, wherein a circular visible area is defined on the light scattering surface around the mounting hole to cause the light guide plate to be used in a digital clock when the mounting hole is used for mounting indexes of the digital clock.

11. The backlight module as described in claim 8, wherein the light scattering dots are hemispherical protrusions protruding upwardly from the light scattering surface.

12. The backlight module as described in claim 8, wherein the plurality of rows of the light scattering dots are arranged from the first side to the second side of the light scattering surface along a lengthwise direction of the light guide plate, and the light scattering dots in each row are arranged on the light scattering surface along a width direction of the light guide plate.

13. The backlight module as described in claim 12, wherein the light scattering dots of adjacent rows are aligned with each other along the lengthwise direction of the light guide plate.

14. The backlight module as described in claim 12, wherein the light scattering dots of adjacent rows are arranged alternately to each other along the lengthwise direction of the light guide plate.

15. The backlight module as described in claim 8, wherein the at least two light sources are LEDs and face the mounting hole.

16. A light guide plate adapted for distributing light from a light source, the light guide plate comprising:
   a light scattering surface;
   a light output surface opposite to the light scattering surface, and
   a plurality of side surfaces surrounding the light scattering surface and the light output surface;
   wherein the light scattering surface comprises a mounting portion adjacent to a side surface of the light guide plate and a light scattering portion beside the mounting portion, a plurality of light scattering dots are formed on the light scattering portion of the light scattering surface, at least two receiving recesses are defined at the mounting portion adjacent to the first side of the light scattering surface, a mounting hole is defined approximately in a middle portion of the light scattering surface, the at least two receiving recesses are obliquely oriented to the mounting hole and are adapted for receiving at least two light sources therein, and the light scattering dots surround the mounting hole.

17. The light guide plate as described in claim 16, wherein a circular visible area is defined on the light scattering surface around the mounting hole to cause the light guide plate to be used in a digital clock when the mounting hole is used for mounting indexes of the digital clock.

18. The light guide plate as described in claim 16, wherein the light scattering dots are hemispherical protrusions protruding upwardly from the light scattering, surface, the light scattering dots are arranged in a plurality of rows arranged from a first side of the light scattering surface to an opposite second side of the light scattering surface, the plurality of rows of the light scattering dots are arranged from the first side to the second side of the light scattering surface along a lengthwise direction of the light guide plate, and the light scattering dots in each row are arranged on the light scattering surface along a width direction of the light guide plate.

19. The light guide plate as described in claim 18, wherein the light scattering dots of adjacent rows are aligned with each other along the lengthwise direction of the light guide plate.

20. The light guide plate as described in claim 18, wherein the light scattering, dots of adjacent rows are arranged alternately to each other along the lengthwise direction of the light guide plate.

* * * * *